United States Patent
Dewar et al.

(10) Patent No.: US 7,766,647 B2
(45) Date of Patent: *Aug. 3, 2010

(54) OPEN LOOP PRESSURE CONTROL FOR INJECTION MOLDING

(75) Inventors: Neil Dewar, Georgetown (CA); Vijay Kudchadkar, Mississauga (CA); Peter Klobucar, Georgetown (CA)

(73) Assignee: Mold-Masters (2007) Limited, Georgetown, ON (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/499,211

(22) Filed: Jul. 8, 2009

(65) Prior Publication Data

US 2009/0274787 A1 Nov. 5, 2009

Related U.S. Application Data

(63) Continuation of application No. 11/763,901, filed on Jun. 15, 2007, now Pat. No. 7,559,762.

(60) Provisional application No. 60/814,044, filed on Jun. 16, 2006.

(51) Int. Cl.
*B29C 45/23* (2006.01)

(52) U.S. Cl. .................................. 425/564; 425/566

(58) Field of Classification Search ................ 425/562, 425/563, 564, 565, 566
See application file for complete search history.

(56) References Cited

U.S. PATENT DOCUMENTS

| | | |
|---|---|---|
| 2,912,719 A | 11/1959 | Gilmore et al. |
| 3,010,156 A | 11/1961 | Smith |
| 3,164,863 A | 1/1965 | Hunt |
| 3,231,938 A | 2/1966 | Seymour |

(Continued)

FOREIGN PATENT DOCUMENTS

CA     726080     1/1966

(Continued)

OTHER PUBLICATIONS

Husky, "Hot Runner with Variable Pressure Drop", www.priorartdatabase.com/ipcom/000008045 (Nov. 2001), pp. 1-2.

(Continued)

*Primary Examiner*—Tim Heitbrink
(74) *Attorney, Agent, or Firm*—Medler Ferro PLLC

(57) ABSTRACT

An injection molding system is disclosed having a self-regulating valve for balancing melt flow. The self-regulating valve includes a control rod configured to balance the melt flow rate through a hot runner system. The self-regulating valve reacts to an injection or melt pressure within the hot runner system and a pre-set force provided by an external force device. The self-regulating valve is an open-loop system as it requires neither a measurement of pressure by a sensor nor feedback from a processor in order to regulate the melt flow. The self-regulating valve mechanically reacts to changes in melt pressure on control surfaces thereof by "bobbing" upwards/downwards to decrease/increase the melt flow accordingly. The self-regulating valve compensates for conditions that affect melt pressure, such as an increase/decrease in melt viscosity, changes in melt temperature, and/or mold cavity size without the use of a processing device.

21 Claims, 10 Drawing Sheets

U.S. PATENT DOCUMENTS

| | | | |
|---|---|---|---|
| 3,241,191 A | 3/1966 | Nouel | |
| 3,270,115 A | 8/1966 | Nouel | |
| 3,344,477 A | 10/1967 | Stokis | |
| 3,777,990 A | 12/1973 | Herzog | |
| 3,807,914 A | 4/1974 | Paulson et al. | |
| 3,868,061 A | 2/1975 | Hehl | |
| 3,954,209 A | 5/1976 | Ramond | |
| 4,106,887 A | 8/1978 | Yasuike et al. | |
| 4,285,661 A | 8/1981 | Yotsutsuji | |
| 4,289,468 A | 9/1981 | von Holdt | |
| 4,380,422 A | 4/1983 | von Holdt | |
| 4,394,117 A | 7/1983 | Taylor | |
| 4,560,342 A | 12/1985 | Ishida et al. | |
| 4,681,528 A | 7/1987 | Maruyama et al. | |
| 4,747,770 A | 5/1988 | Schmidt | |
| 4,781,572 A | 11/1988 | Boring | |
| 4,808,106 A | 2/1989 | von Holdt | |
| 5,098,280 A | 3/1992 | Trakas | |
| 5,125,817 A | 6/1992 | Yamachika | |
| 5,200,207 A | 4/1993 | Akselrud et al. | |
| 5,288,225 A | 2/1994 | Schmidt et al. | |
| 5,378,138 A | 1/1995 | Onuma et al. | |
| 5,387,099 A | 2/1995 | Gellert | |
| 5,556,582 A | 9/1996 | Kazmer | |
| 5,902,614 A | 5/1999 | Kuntz | |
| 5,927,449 A | 7/1999 | Huang et al. | |
| 6,074,191 A | 6/2000 | Gellert et al. | |
| 6,228,309 B1 | 5/2001 | Jones et al. | |
| 6,254,377 B1 | 7/2001 | Kazmer et al. | |
| 6,305,563 B1 | 10/2001 | Elliott | |
| 6,436,320 B1 | 8/2002 | Kazmer et al. | |
| 6,464,909 B1 | 10/2002 | Kazmer et al. | |
| 6,683,283 B2 | 1/2004 | Schmidt | |
| 6,739,863 B2 | 5/2004 | Olaru | |
| 6,936,199 B2 | 8/2005 | Olaru | |
| 7,029,268 B2 | 4/2006 | Doyle et al. | |
| 7,175,419 B2 | 2/2007 | Babin | |
| 7,175,420 B2 | 2/2007 | Babin et al. | |
| 7,192,270 B2 | 3/2007 | Babin | |
| 7,225,953 B1 | 6/2007 | Tooman | |
| 7,306,446 B2 | 12/2007 | Sabin et al. | |
| 7,559,762 B2 * | 7/2009 | Dewar et al. | 425/564 |
| 2002/0121713 A1 | 9/2002 | Moss et al. | |
| 2003/0203064 A1 | 10/2003 | Doughty et al. | |
| 2004/0047935 A1 | 3/2004 | Moss et al. | |
| 2004/0119182 A1 | 6/2004 | Kazmer | |
| 2004/0166189 A1 | 8/2004 | Babin | |
| 2004/0185142 A1 | 9/2004 | Olaru | |
| 2005/0046082 A1 | 3/2005 | Dewar | |
| 2005/0255187 A1 | 11/2005 | Kazmer | |
| 2006/0127527 A1 | 6/2006 | Doyle et al. | |
| 2006/0145395 A1 | 7/2006 | Takigawa | |
| 2008/0023862 A1 | 1/2008 | Niewels et al. | |

FOREIGN PATENT DOCUMENTS

| | | |
|---|---|---|
| CA | 2 457 643 | 8/2004 |
| DE | 4311196 | 10/1994 |
| DE | 19619882 | 11/1997 |
| DE | 29909535 | 8/1999 |
| DE | 19811466 | 9/1999 |
| DE | 19857735 | 6/2000 |
| EP | 0011805 | 6/1980 |
| EP | 0077847 | 5/1983 |
| EP | 891851 | 1/1999 |
| EP | 0967063 | 12/1999 |
| EP | 1052078 | 11/2000 |
| EP | 1 426 160 | 6/2004 |
| JP | 55061438 | 5/1980 |
| JP | 58142833 | 8/1983 |
| JP | 61063428 | 4/1986 |
| JP | 61188118 | 8/1986 |
| JP | 63166511 | 7/1988 |
| JP | 04138234 A | 5/1992 |
| JP | 6339951 | 12/1994 |
| JP | 8156025 | 6/1996 |
| WO | WO-01/21377 | 3/2001 |
| WO | WO-01/60580 | 8/2001 |
| WO | WO-03/057448 | 7/2003 |
| WO | WO-2006/075857 | 7/2006 |
| WO | WO-2006/080807 | 8/2006 |

OTHER PUBLICATIONS

Muller, Walter, Ewikon Hot Runner Systems, "Success with Advanced Technology", (Jun. 1998), pp. 12-13.

Priamus System Technologies AG, "Priamus Fill and Cool Type 7005A", (Feb. 2005), pp. 1-6.

Schubert, Art, "The Promise and Practice of Valve Gate Sequencing", (date unknown), pp. 1-8.

Ewikon, "Success With Advanced Technology," (Jun. 1998), pp. 12-13.

* cited by examiner

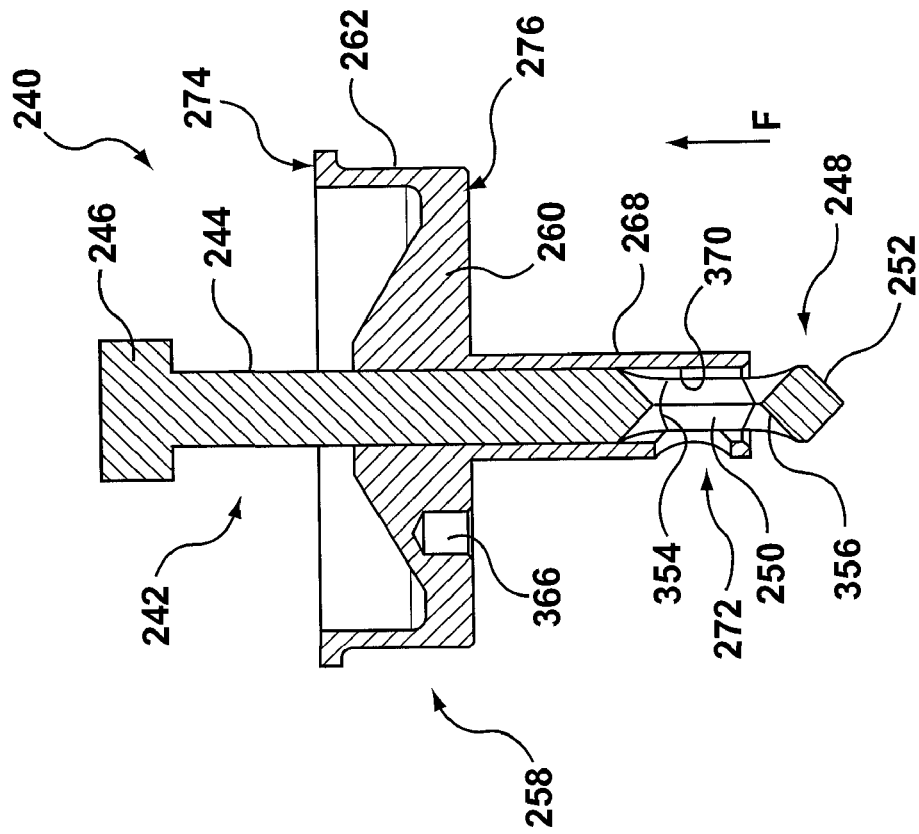
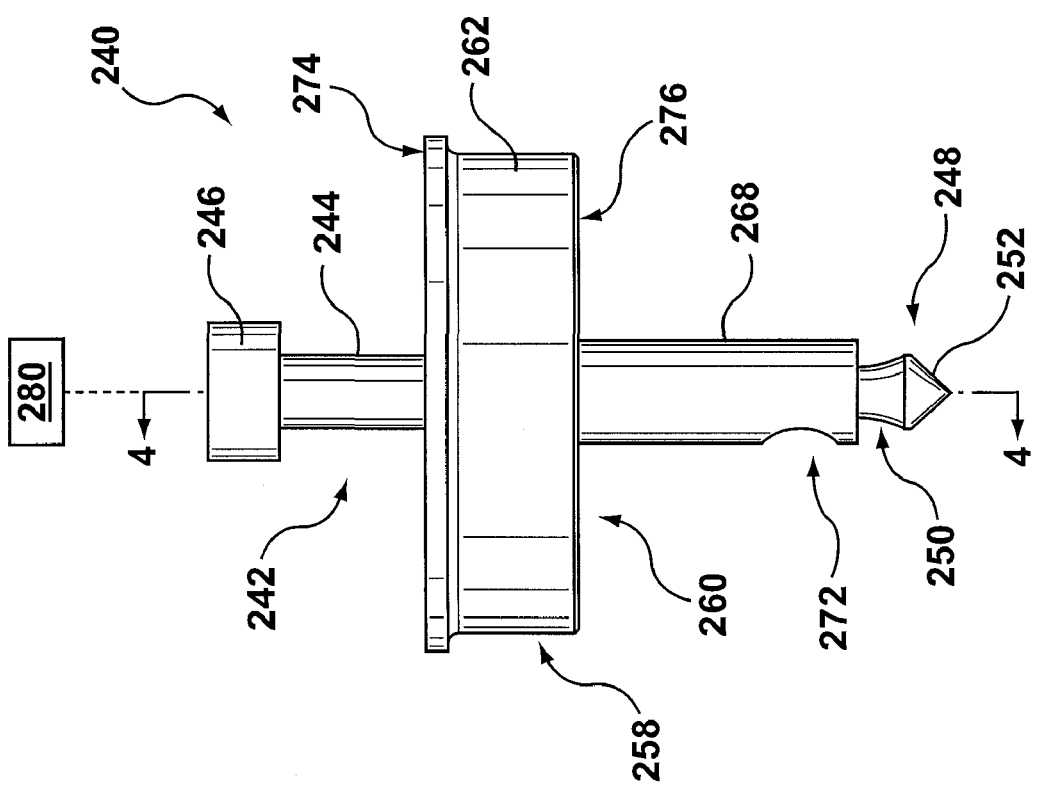

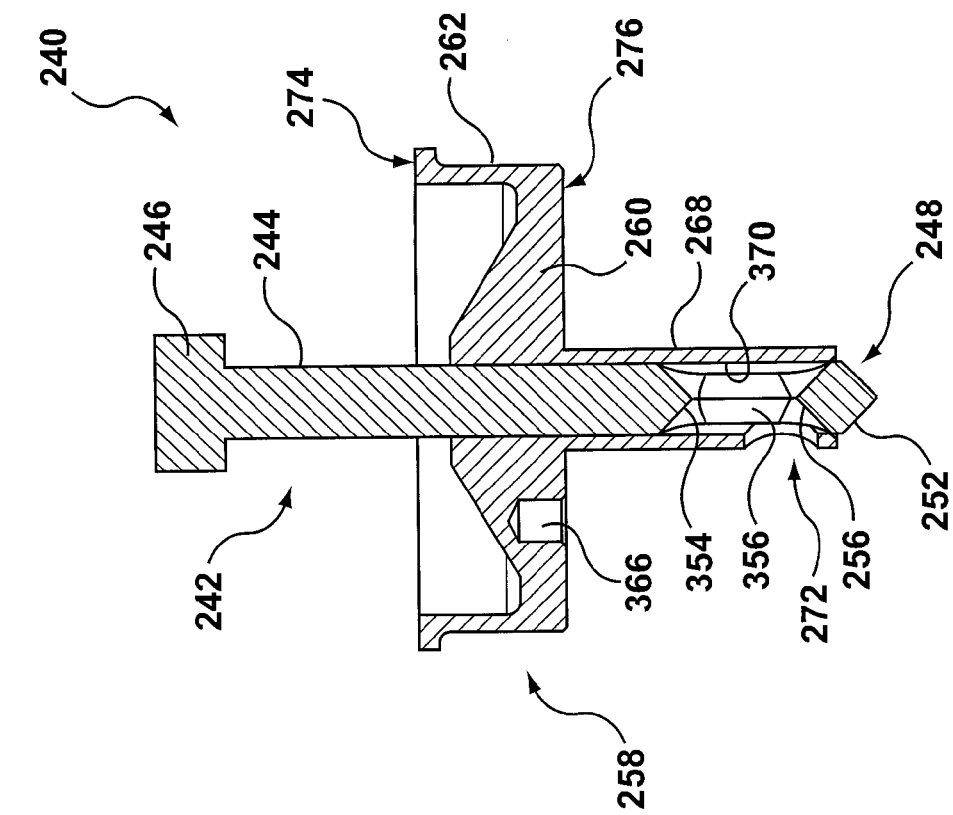
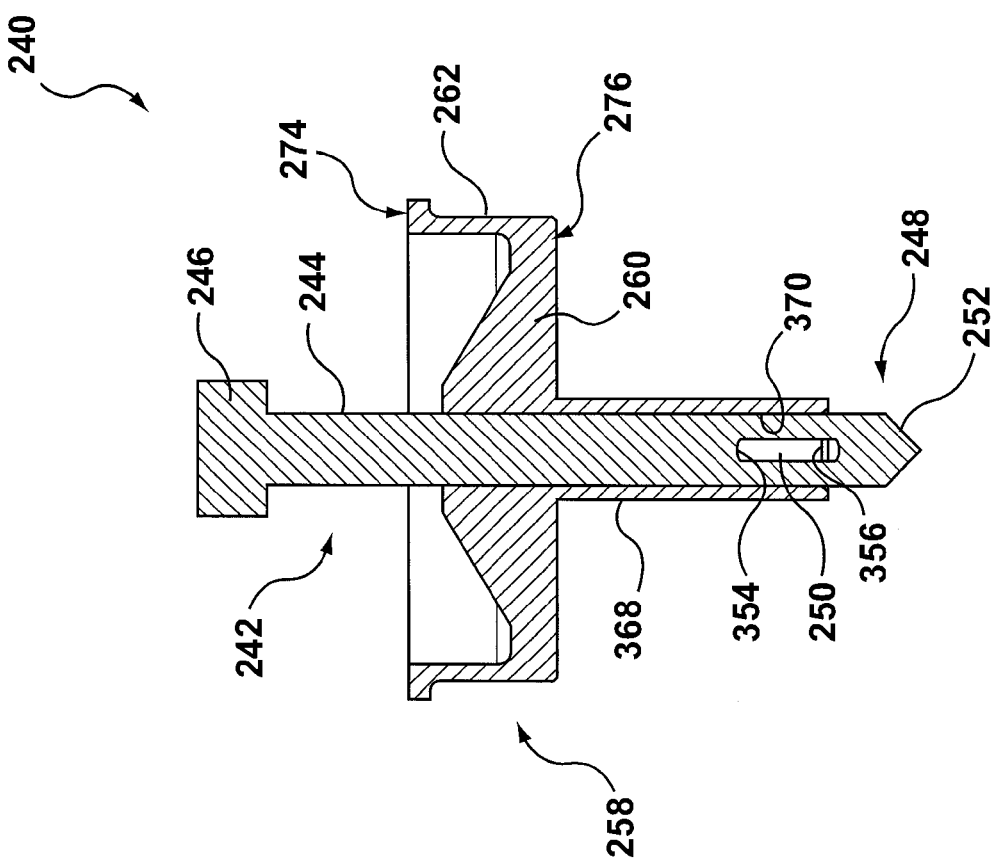

OPEN LOOP PRESSURE CONTROL FOR INJECTION MOLDING

CROSS-REFERENCE TO RELATED APPLICATION

This application is a continuation of U.S. application Ser. No. 11/763,901, filed Jun. 15, 2007 that issued as U.S. Pat. No. 7,559,762 on Jul. 14, 2009, which claims the benefit under 35 U.S.C. §119(e) of provisional application U.S. Appl. No. 60/814,044, filed Jun. 16, 2006, the disclosures of which are incorporated by reference herein in their entirety.

FIELD OF THE INVENTION

The invention relates to injection molding, and particularly to an apparatus and method of open-loop pressure control for balancing the melt flow in a hot runner system.

BACKGROUND OF THE INVENTION

Injection molding is a common manufacturing practice. Injection molding is a cyclic process in which melted (plasticized) plastic is injected (forced) into a mold cavity or cavities, where it is held under pressure until it is removed in a solid state, basically duplicating the cavity of the mold. Various articles of commercial value, such as plastic bottles, toothbrushes, automotive parts, medial device, children's toys, etc., are made using well-known injection molding techniques.

One type of injection molding process, referred to as hot runner injection molding, generally involves melting a material, which is often a polymeric material or resin, then forcing the melt stream at high temperatures and pressures to flow through an injection manifold that communicates with one or more hot runner nozzles. The heated nozzles further guide the melt flow through a mold gate into one or more mold cavities. The melt cools in the shape of the mold cavity, which is opened to eject the finished part.

One method to control the flow of the melt stream into a mold cavity is by using a valve-gated injection molding apparatus. Usually a valve pin has a cylindrical or tapered front end and reciprocates between a retracted open position and an extended closed position, in which the front end is seated in a gate. In some applications, the valve pin functions in the reverse direction and closes in the retracted position.

Valve-gated mechanisms are, however, typically designed to open and close the gates in a binary fashion, i.e., the gate is either opened or it is closed without allowing for a partially-opened configuration in which the melt flow rate or amount is controlled through the gate.

In some manufacturing processes, the ability to control the melt stream (i.e., temperature and pressure of the melt) during the shot is highly desirable. Another instance in which control over the melt stream flow is desirable is when a number of parts are simultaneously molded in separate cavities. Typically, in this case feed systems are used to deliver the molten plastic from the injection unit to the separate cavities. In many or most injection molds, multiple branches and outlets are used in the feed system to deliver the melt to the separate cavities, so as to simultaneously form multiple articles or complex articles that require multiple flows of melt. Each mold cavity is fed from a common melt stream through one or more gates. In such a system, the mold cavities are not necessarily all the same size, such as when components of an interlocking assembly, such as cellular telephone housings, are simultaneously molded. Thus, the optimum pressure to fill and pack each cavity is different. This is because when the cavities are of different sizes and shapes and/or the melt travel time to each cavity is different, properties of the melt, e.g., viscosity, is affected. Thus, it is typically not possible to optimize pressure for each cavity by controlling an overall pressure of the injection molding machine.

In a multi-gated system in which a single mold cavity is fed melt through multiple hot runner nozzles and mold gates, a common manifold can serve all of the gates. In such a system a "knit line" or "weld line" may be formed at the interface where melt flowing from one gate meets melt flowing from another gate. Even though all of the gates are commonly fed, the ability to individually control the flow rate through each gate allows a designer to control the location of the knit line for structural or aesthetic purposes. Also, part quality attributes are significantly affected by the flow-rates and pressures in the injection stage of the molding cycle. Typical part defects such as hesitation, jetting, unbalanced filling, knit-lines, orientation, and race-tracking are influenced by flow rates in the filling stage. Typical part defects related to the packing stage dynamics are sink, flash, shrinkage, warpage, and residual stress. Any changes made to the velocity/pressure profile simultaneously affect the flow-rates and pressures in all the cavities in the mold.

Various methods exist or have been proposed in the art to provide flow control over the melt stream. One way to provide flow control is to individually re-tool the runner for every new product, but this is expensive and time-consuming. Alternatively, dynamic systems incorporating sensors and closed-loop control with multiple adjustable valve pins, or flow control rods, have been proposed. As a further alternative, passive systems have been utilized.

In one dynamic feed system utilizing a closed-loop system with pressure sensors, each valve pin extends through a nozzle body and is aligned with its own respective gate, and the gates are each fluidly connected to a common mold cavity or respective cavities. The valve pins are exposed to the high pressure melt through the length of the nozzle body. Pressure data measured by the pressure sensors is read at or near the injection point into the mold cavity. Each valve pin of the system is then dynamically adjusted by a computer according to the pressure data measured by the pressure sensors for the corresponding injection point.

Other dynamic feed systems have been proposed that utilize melt flow control rods positioned upstream of the gate that interact with a narrowed portion of the melt channel to control melt flow. Such dynamic feed systems impose additional costs in equipment, i.e., require a controller, pressure transducers/sensors, etc. in order to create the required closed-loop feedback system, as well as in operating costs due to the complexity of the systems. In addition, oftentimes a large portion of the pin, or control rod, is unsupported during operation and subject to deflection that may result in misalignment and reduced service life.

In another dynamic system, the manifold includes a "shooting pot." A portion of the melt stream is diverted from the manifold melt channel into a separate compartment or "well." An actuated ram is disposed within the well and can be positioned to seal the opening of the well. A valve-gated nozzle is located downstream of the well such that a flow of melt through a mold gate orifice is controlled by an actuated valve pin. When the melt stream is introduced into the manifold melt channel, the valve pin is seated within the mold gate orifice to prevent flow into a mold cavity. The well ram is located in a retracted position so that a volume of melt from the manifold may be diverted into the well and contained therein. To start the shot, a gating mechanism located upstream from the well closes the manifold melt channel, thereby preventing the introduction of new melt into the well. The valve pin of the nozzle is unseated from the mold gate orifice, and the ram is moved forward at a first velocity to force melt from the well into the nozzle melt channel and subsequently into the mold cavity. A system of pressure sensors measures the pressure in the system and compares that pressure reading to a target pressure profile. If greater pressure is required, the ram velocity is increased. Alternatively, if lesser pressure is required, the ram velocity is slowed. When the ram reaches its lowermost position, the mold cavity is full, and the valve pin is moved forward to close the mold gate. Through this manipulation of the ram velocity, the flow rate of the melt stream can be controlled. This control over the melt stream requires completely closing off one portion of the manifold melt channel in order to manipulate the melt stream in another portion thereof. In addition to imposing additional costs associated with the control of the rams and valve pins, the system also creates a secondary interruption in the melt flow. Such secondary interruptions may create additional imperfections in the molded parts.

In another system, a sliding spool valve includes at least one recess used to control the volumetric flow of melt and a separate gate closure portion. The valve is configured so that the melt flowing through the valve creates minimal axial force upon the spool thereby minimizing the force necessary to actuate the spool. The recess is configured primarily to control the volumetric flow of the melt so the size of the gate closure portion can be reduced. Both the upstream and downstream ends of the spool, except for the small gate closure portion, are exposed to atmospheric pressure. The valve is operated in either a preset profile or a dynamic fashion. For example, the preset profile mode can mean that an open loop or no loop system is used that has no feedback control and that uses a preset operating profile for controlling pressure. In contrast, the dynamic operation mode can mean that a closed loop system is used that has feedback control and that uses a continuously changing operating profile for controlling pressure, which is based on a real-time sensed condition. In the preset profile mode, the position of the spool valve is profiled in the filling stage of the molding process to provide a varying volumetric flow rate. Alternatively, in the dynamic mode, the location of the spool valve is controlled or the location is adjusted based on measurements of the melt pressure or load on the spool valve. Regardless of the mode of operation, this system requires that the spool valve and housing both have complicated geometries. In addition, means for venting a portion of the spool valve, which may be positioned deep within a mold block, must be provided. Furthermore, if the system is operated in the dynamic mode, it provides the additional shortcomings of the dynamic systems described above.

Various passive systems have been developed. In general, the passive systems commonly utilize a spring-loaded plunger that closes the gate of a nozzle when the plunger is in a retracted position and only operate in an open or closed position. The upstream end of the plunger has a projected surface area exposed to the melt that differs from a projected surface area on the downstream end of the plunger. At the beginning of an injection cycle, the pressure upstream of the plunger is generally higher than the pressure of the melt downstream, which causes the plunger to extend, thereby opening the gate. As the pressure downstream of the plunger in the cavity increases, the differing surface areas, in combination with the spring force, creates a net force differential on the plunger causing it to retract into its closed position. In such systems, the plunger is generally unsupported along its length and the plunger and/or spring are exposed to the melt. As a result, these passive systems may also be prone to reduced service lives.

BRIEF SUMMARY OF THE INVENTION

An injection molding system is provided that includes a manifold having a manifold melt channel and an injection molding nozzle having a nozzle melt channel, wherein the nozzle melt channel is in fluid communication with an outlet of the manifold melt channel. The injection molding system also includes a self-regulating valve partially positioned within the manifold melt channel upstream of the nozzle melt channel. The self-regulating valve includes a control rod having an opening in a downstream end, wherein the control rod is slidable within the manifold melt channel. The control rod further includes a tip pressure surface at a downstream end. The self-regulating valve is configured to regulate a melt stream flowing through the control rod opening from the manifold melt channel to the inlet of the nozzle melt channel. In response to opposing forces that are exerted on the control rod by an external force device acting on a head portion of the control rod and fluid pressure exerted by the melt on the tip pressure surface of the control rod, the control rod slides upwards and/or downwards to balance the melt flow during an injection cycle.

Further embodiments, features, and advantages of the present inventions, as well as the structure and operation of the various embodiments of the present invention, are described in detail below with reference to the accompanying drawings.

BRIEF DESCRIPTION OF THE FIGURES

The accompanying drawings, which are incorporated herein and form a part of the specification, illustrate one or more embodiments of the present invention and, together with the description, further serve to explain the principles of the invention and to enable a person skilled in the pertinent art to make and use the invention.

FIG. 2 is a side view of a self-regulating valve according to an embodiment of the invention.

FIG. 3 is a sectional view of the self-regulating valve shown in FIG. 2 in an open position, taken in the plane of the page of FIG. 2.

FIG. 4 is another sectional view of the self-regulating valve of FIG. 2 taken along line 4-4.

FIG. 5 is a sectional view of the self-regulating valve of FIG. 2 in a closed position, taken in the plane of the page of FIG. 2.

Figure 1:
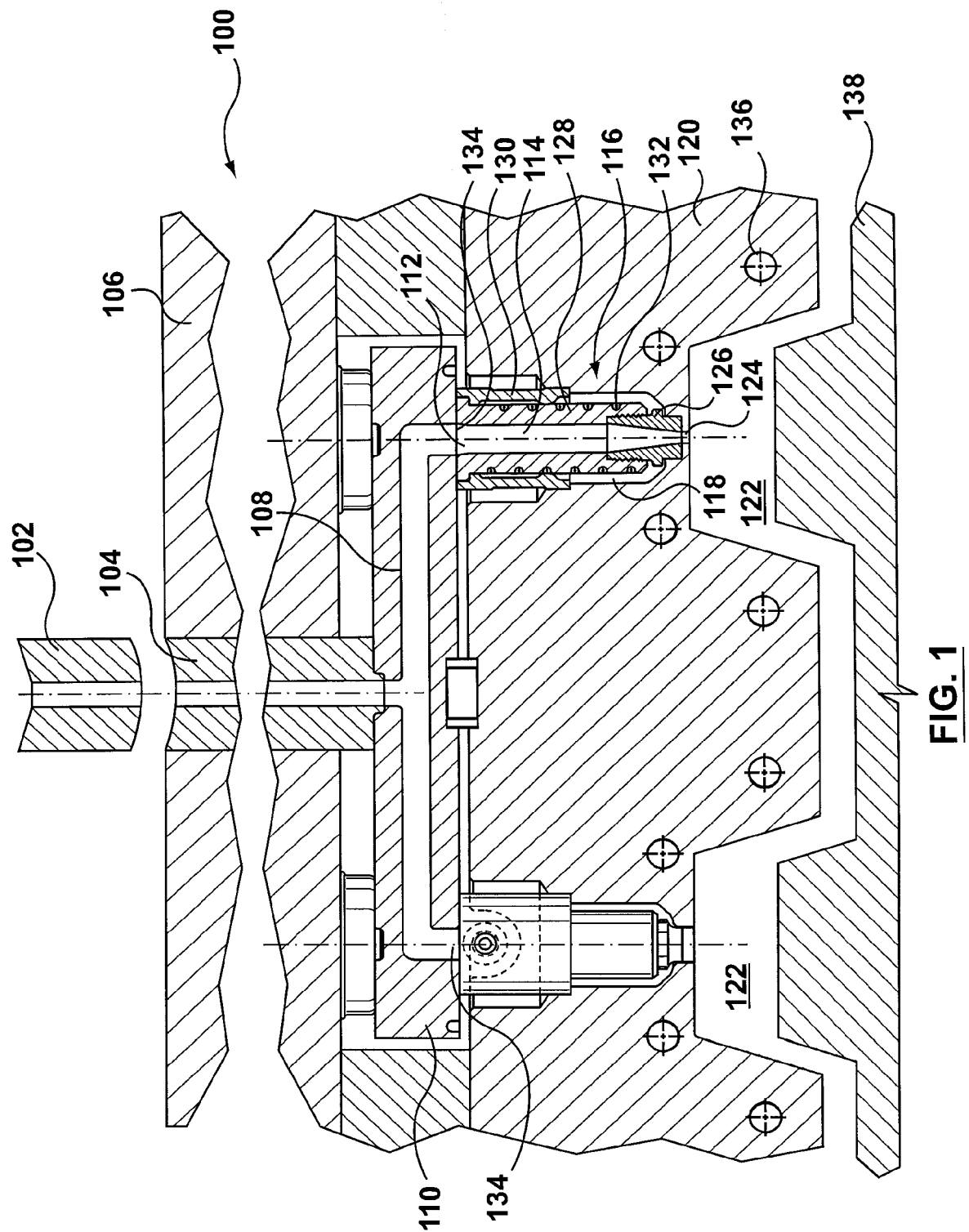
FIG. 1 is a sectional view of an injection molding apparatus for use with embodiments of the present invention.

One or more embodiments of the present invention will now be described with reference to the accompanying drawings. In the drawings, like reference numbers can indicate identical or functionally similar elements. Additionally, the left-most digit(s) of a reference number can identify the drawing in which the reference number first appears.

DETAILED DESCRIPTION OF THE INVENTION

Specific embodiments of the present invention are now described with reference to the figures, where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention.

FIG. 1 shows an injection molding apparatus 100. Injection molding apparatus 100 includes a machine nozzle 102, which introduces a melt stream under pressure into the injection molding system via a sprue bushing 104 that is positioned within a machine platen 106. From sprue bushing 104, melt flows into a manifold melt channel 108 provided in a hot runner manifold 110. In injection molding apparatus 100, manifold 110 allows the melt stream to be distributed through manifold melt channel outlets 134 and into nozzle melt channels 114 provided in respective hot runner nozzles 116. Hot runner nozzles 116 are positioned within nozzle bores, or cavities, 118 of a mold plate 120, and each of hot runner nozzles 116 is aligned with a mold gate 124 by an alignment collar 130. As would be apparent to one of ordinary skill in the art, mold plate 120 may include one or more mold plates, and/or a mold cavity plate. A mold core plate 138 mates with mold plate 120 to form mold cavities 122. Each hot runner nozzle 116 is in fluid communication with a respective mold cavity 122 via mold gate 124 so that the melt stream may be injected through nozzle melt channel 114 and a nozzle tip 126 and into mold cavities 122.

One of hot runner nozzles 116, included in FIG. 1, is shown in cross-section. Hot runner nozzle 116 has a nozzle melt channel inlet 112, at an upper end of nozzle melt channel 114, aligned with outlet 134 of manifold melt channel 108 to receive the melt stream and to deliver the melt through mold gate 124 to mold cavity 122. Hot runner nozzle 116 includes a nozzle body 128 and nozzle tip 126. Injection molding apparatus 100 may include any number of such hot runner nozzles 116 located in respective nozzle bores 118 for transmitting melt from respective nozzle melt channel inlets 112 to respective mold gates 124. Injection molding apparatus 100 utilizes a heating element 132 in each nozzle and cooling channels 136 in the mold plate 120 to moderate the temperature of the melt. As shown, hot runner nozzle 116 is thermal-gated, however it should be understood that hot runner nozzle 116 may alternatively be valve-gated as discussed in further detail with respect to FIGS. 7 and 8.

A melt flow regulating assembly or self-regulating valve 240 according to an embodiment of the present invention is shown in FIGS. 2-5. Melt flow regulating assembly 240 balances the melt flow rate and the amount of melt delivered from manifold channel 108 to a respective hot runner nozzle 116 and from there into a respective mold cavity 122. Melt flow regulating assembly 240 operates based on one or more of the injection pressure inside the manifold, the nozzle and/or the mold cavity and, in certain embodiments, a pre-set axial force provided by an external force device, as described in more detail below. Melt flow regulating assembly 240 is an open-loop system because it requires neither a measurement of pressure by a sensor nor feedback from a processor in order to regulate the melt flow. Instead, melt flow regulating assembly 240 mechanically reacts to changes in melt pressure on its control/pressure surfaces by "bobbing" upwards and downwards to decrease or increase flow accordingly, as described in more detail below. As such, melt flow regulating assembly 240 may compensate for any condition that affects a change in melt pressure, such as but not limited to an increase/decrease in melt viscosity and/or melt temperature, and/or a change in mold cavity size, etc. without the use of an active controller or processor.

Melt flow regulating assembly or self-regulating valve 240 generally includes a control rod 242 and a valve disk 258. Control rod 242 includes a control rod body 244, a head portion 246 at an upstream end of control rod body 244, a control rod tip portion 248 at a downstream end of control rod body 244, and an opening, aperture, needle eye, hole, etc. 250 upstream of control rod tip portion 248.

Control rod body 244 is generally an elongated cylindrical body. In an alternate embodiment, control rod body 244 may have a cross-section of any shape and need not be cylindrical. Furthermore, the cross-sectional area of the control rod body does not need to be consistent over the length and such a difference in cross-sectional area may be utilized to create a net force on the control rod when it is subjected to fluid pressure.

Head portion 246 may be an enlarged portion of control rod body 244, as shown. Head portion 246 may be used to connect control rod 242 to an external force device 280 that applies either a constant or variable axial force on control rod 242. Head portion 246 and control rod body 244 may alternatively be configured so that the weight of control rod alone provides any necessary axial force. As may be apparent to one of ordinary skill in the art, any device capable of applying an axial force may be used as external force device 280, for example, a hydraulic or pneumatic actuator, a linear electro-mechanical actuator, a weight, or a spring.

Control rod tip portion 248 includes a tip pressure surface 252 that is subjected to melt pressure during operation, thereby creating a force upon control rod 242 in the direction of the head portion 246, as represented by arrow F in FIG. 3. As may be known by one of ordinary skill in the art, fluid pressure applied to a surface of a body will result in a force upon the body proportional to the projected area of the surface. Therefore, tip portion 248 and pressure surface 252, in particular, can be configured to provide a predetermined axial force upon control rod 242 for a given melt pressure.

With reference to FIG. 3, and continuing reference to FIG. 2, needle eye 250 is a slot, or through hole, that extends laterally through control rod body 244. Needle eye 250 includes an upper pressure surface 354 and a lower pressure surface 356. When melt flows into needle eye 250, it exerts pressure upon both upper pressure surface 354 and lower pressure surface 356. Needle eye 250 may be configured so that upper pressure surface 354 and lower pressure surface 356 have the same or different projected areas. Where the projected areas of the two surfaces are different, a net force upon control rod 242 may be created when pressurized melt flows into needle eye 250 and the self-regulating valve 240 is closed.

Needle eye 250 is also tapered from the outer surface of control rod body 244 toward the radial center of control rod body 244, such that the cross sectional area of control rod body 244 is smallest at its radial center proximate needle eye 250. It shall be appreciated that although needle eye 250 is shown as a rectangular tapered slot, the cross-section and/or taper of the needle eye 250 are not limited to the configuration shown and may be altered in order to alter the flow characteristics of the self-regulating valve 240. In particular, needle eye 250 may have any cross-sectional shape such as circular or square, and the taper at the upper end and/or one lateral side of the needle eye 250 may be different than the taper at the lower end and/or the opposite lateral side.

Control rod 242 may be constructed from any suitable material and may include a wear resistant coating as would be apparent to one of ordinary skill in the art. For example, control rod 242 may be constructed from, but not limited to, steel, titanium, or ceramic. Control rod 242 may be constructed with a material that has thermal properties similar to valve disk 258 so that thermal expansion will not affect the operation of self-regulating valve 240.

Valve disk 258 includes a disk flange 260, a side wall 262 and a control rod support extension 268. Disk flange 260 extends laterally outward from a bore 370 that extends longitudinally through valve disk 258. Disk flange 260 has a greater thickness in the center that defines an upper portion of valve disk bore 370, and disk flange 260 is tapered toward a thinner portion at its outer edge proximate side wall 262. A lower surface of disk flange 260 provides a lower mounting surface 276. Disk flange 260 also includes a locating feature 366. Locating feature 366 in the present embodiment is a bore that extends into disk flange 260 from lower mounting surface 276 and is configured to receive a dowel pin provided in a mating part (not shown) of an injection molding apparatus. Side wall 262 extends upward from the outer edge of disk flange 260 to an upper mounting surface 274.

Figure 6:
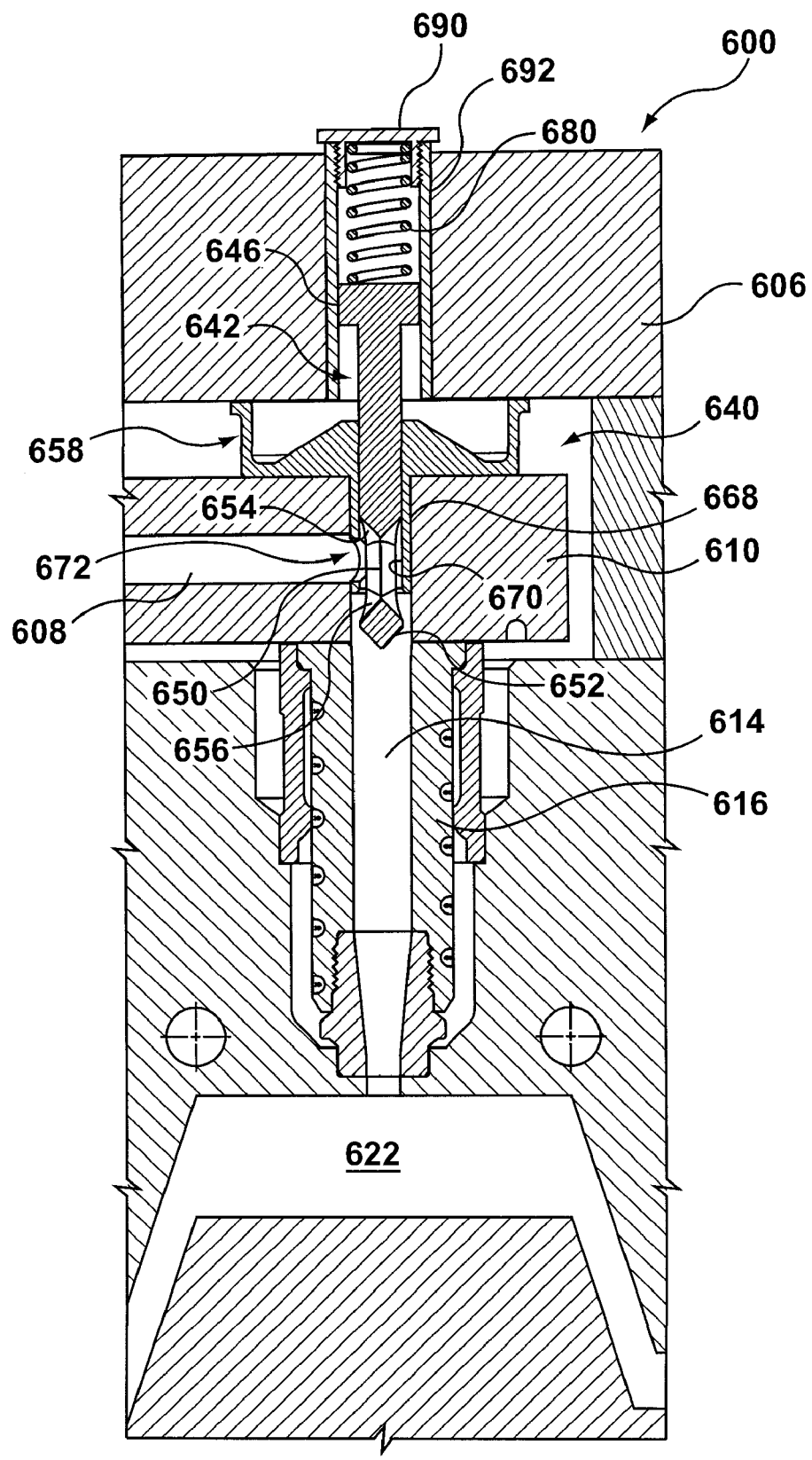
FIG. 6 is a sectional view of a portion of an injection molding apparatus including a self-regulating valve according to another embodiment of the present invention.

Control rod support extension 268 extends downward from disk flange 260 and defines a lower portion of valve disk bore 370. Flow aperture 272 extends laterally through control rod support extension 268 to be in fluid communication with valve disk bore 370. Control rod support extension 268 may have any cross-sectional shape, such as circular, square or rectangular. However, generally, control rod support extension 268 will be placed within a channel in the manifold, or in a mating component, and the cross-sectional shape will be configured to match that channel, as shown in FIG. 6 and described below. In addition, the cross-section of valve disk bore 370 is generally configured to match the cross section of control rod 242.

Valve disk 258 may be constructed from any suitable material and may include a wear resistant coating as would be apparent to one of ordinary skill in the art. Valve disk 258 may be made of a harder or more wear resistant material than manifold 210 to improve its wear resistance. For example, valve disk 258 may be constructed from, but not limited to, steel, titanium, ceramic, hardened or treated steel, or tungsten carbide. Valve disk 258 may also be used as a thermal insulator, as shown in FIG. 6. When it is used for such a function it will generally be constructed from less thermally conductive materials than the surrounding manifold 110/610, such as titanium or ceramic. Any valve bushing design that includes a support extension that can be modified to include an aperture 272 may be used in place of valve disk 258 without departing from the scope of the present invention.

Control rod 242 extends through valve disk bore 370 defined by disk flange 260 and support extension 268 such that control rod 242 is slidably received within valve disk 258. Needle eye 250 is located adjacent to flow aperture 272 of support extension 268. As shown in FIG. 4, control rod 242 is configured so that it is laterally supported within valve disk bore 370 particularly by the walls of support extension 268.

The lateral support that is provided by support extension 268 prevents misalignment and deflection of control rod 242, which improves the service life of control rod 242. An unsupported control rod 242 may be subjected to premature and/or increased wear that would reduce its service life as may be the case with some prior art valve pin and control rod designs that slide solely within a manifold channel. Valve disk 258 is also readily replaceable if it should become worn or damaged by the plastic melt flow or movement of control rod 242 and may be made of a harder or more wear resistant material than manifold 210 to further improve the performance of self-regulating valve 240.

Control rod 242 is readily slidable within valve disk bore 370 between an open position and a closed position in response to fluid pressure or a combination of fluid pressure and an external force device to achieve various intermediate positions between the open and closed positions that achieve a varied rate of melt flow. As such, control rod 242 may essentially "bob" upwards and downwards within valve disk bore 370 to continually balance the melt flow rate during an injection cycle.

In an embodiment, needle eye 250 is used to reduce pressure on control rod 242 in order to allow it to withstand higher pressures. For example, pressures of 10,000 to 40,000 PSI can be exerted on control rod 242 from the melt. In some instances, control rods that did not include a needle eye were damaged by melt flowing at these pressures. However, melt pressure on control rod 242 is relieved because the melt can pass through needle eye 250 and continue flowing so that the control rod 242 does not have to withstand the full force of the oncoming melt stream.

Self-regulating valve 240 is in the open position, as shown in FIGS. 2-4, when needle eye 250 is exposed to the melt channel downstream of valve disk bore 370 thereby creating a continuous fluid path through self-regulating valve 240. Conversely, self-regulating valve 240 is in the closed position, as shown in FIG. 5, when needle eye 250 is entirely contained within valve disk bore 370 and tip portion 248 of control rod 242 seals against the inner wall of support extension 268 thereby blocking flow through valve disk bore 370.

FIG. 6 shows a self-regulating valve 640 located within an injection molding apparatus 600 that includes an external force device having a spring 680 within a casing 692, which has a threadable, adjustable cap 690. A head portion 646 of control rod 642 is axially loaded a preset amount by spring 680. The amount of axial load exerted by spring 680 on control rod 642 may be adjusted by tightening or backing out threaded cap 690 into/from casing 692.

Valve disk 658 is located between manifold 610 and a back plate 606 and may serve as a thermal insulator. Control rod support extension 668 of valve disk 658 extends into manifold 610 so that flow aperture 672 is in fluid communication within an upstream portion of manifold melt channel 608. Self-regulating valve 640 is positioned at a location where manifold melt channel includes a 90° turn towards a nozzle 616. It shall be appreciated that the angle of the turn in the manifold melt channel is not critical and the self-regulating valve may be employed where the angle is less than or greater than 90°.

Melt from manifold melt channel 608 enters flow aperture 672 and then flows into valve disk bore 670 and further into needle eye 650. When self-regulating valve 640 is in an open position, as shown, a portion of needle eye 650 is exposed to the melt channel downstream of valve disk bore 670 and in a downstream portion of manifold melt channel 608. As a result, the melt that flows into needle eye 650 is able to flow through the downstream portion of manifold melt channel 608 and into hot runner nozzle 616. When self-regulating valve 640 is in a closed position, no portion of needle eye 650 is exposed to the downstream portion of manifold melt channel 608 and melt can not flow through valve 640.

At the beginning of a molding cycle in injection molding apparatus 600, high pressure melt is injected from a machine nozzle (not shown) into manifold melt channel 608 upstream of self-regulating valve 640. The melt flows through manifold melt channel 608 and into flow aperture 672 and then needle eye 650 of self-regulating valve 640. As shown, the projected area of the upper needle eye pressure surface 654 is equal to the projected area of the lower needle eye pressure surface 656, therefore spring 680 is used to apply a downward force on control rod 642 to place self-regulating valve 640 in an open position. However, as described above, self-regulating valve 640 may be configured so that a net downward force is created upon control rod 642 by the melt pressure without an external force device or in combination with an external force device.

In an embodiment, a melt pressure at an outlet (e.g., within nozzle melt channel 614) of self-regulating valve 640 is proportional to the position of control rod 642. The melt pressure at the outlet of self-regulating valve 640 is at a maximum value when control rod 642 is in an fully downward position. The melt pressure at the outlet of self-regulating valve 640 is at a minimum value when control rod 642 is in a fully upward position. The melt pressure at the outlet of self-regulating valve 640 increases as control rod 642 moves from the fully upward position to the fully downward position. The melt pressure at the outlet of self-regulating valve 640 decreases as control rod 642 moves from the fully downward position to the fully upward position. As previously noted, control rod 642 may achieve and hold various intermediate positions effectively "bobbing" between upward and downward intermediate positions to continually balance the melt flow rate during an injection cycle.

As melt flows through manifold melt channel 608, self-regulating valve 640, and nozzle 616 into mold cavity 622, the melt pressure exerts a force on tip pressure surface 652. This melt force tends to push control rod 642 upwards. An external control force, e.g., the force of spring 680, is applied to head portion 646 of control rod 642, which tends to push control rod 642 downwards. Spring 680 may be set to a predetermined axial pressure by adjusting cap 690. The position of control rod 642 is governed by these two forces. In an embodiment, self-regulating valve 640 is designed so that all other forces on the valve components are relatively negligible.

If the external control force of spring 680 acting on head portion 646 of control rod 642 overcomes the melt force acting on tip pressure surface 652, control rod 642 moves downwards. The melt pressure at the outlet of self-regulating valve 640 increases as control rod 642 moves downwards. As a result, the melt force on tip pressure surface 652 increases. Control rod 642 stops moving downward when the melt force on tip pressure surface 652 and the external control force of spring 680 acting on head portion 646 of control rod 642 reach equilibrium, e.g., are substantially equal.

If the melt force acting on tip pressure surface 652 overcomes the external control force of spring 680 acting on head portion 646 of control rod 642, control rod 642 moves upwards. The melt pressure at the outlet of self-regulating valve 640 decreases as control rod 642 moves upwards. As a result, the melt force exerted on tip pressure surface 652 decreases. Control rod 642 stops moving upwards when the melt force on tip pressure surface 652 and the external control force of spring 680 acting on head portion 646 of control rod 642 reach equilibrium, e.g., are substantially equal.

Figure 7:
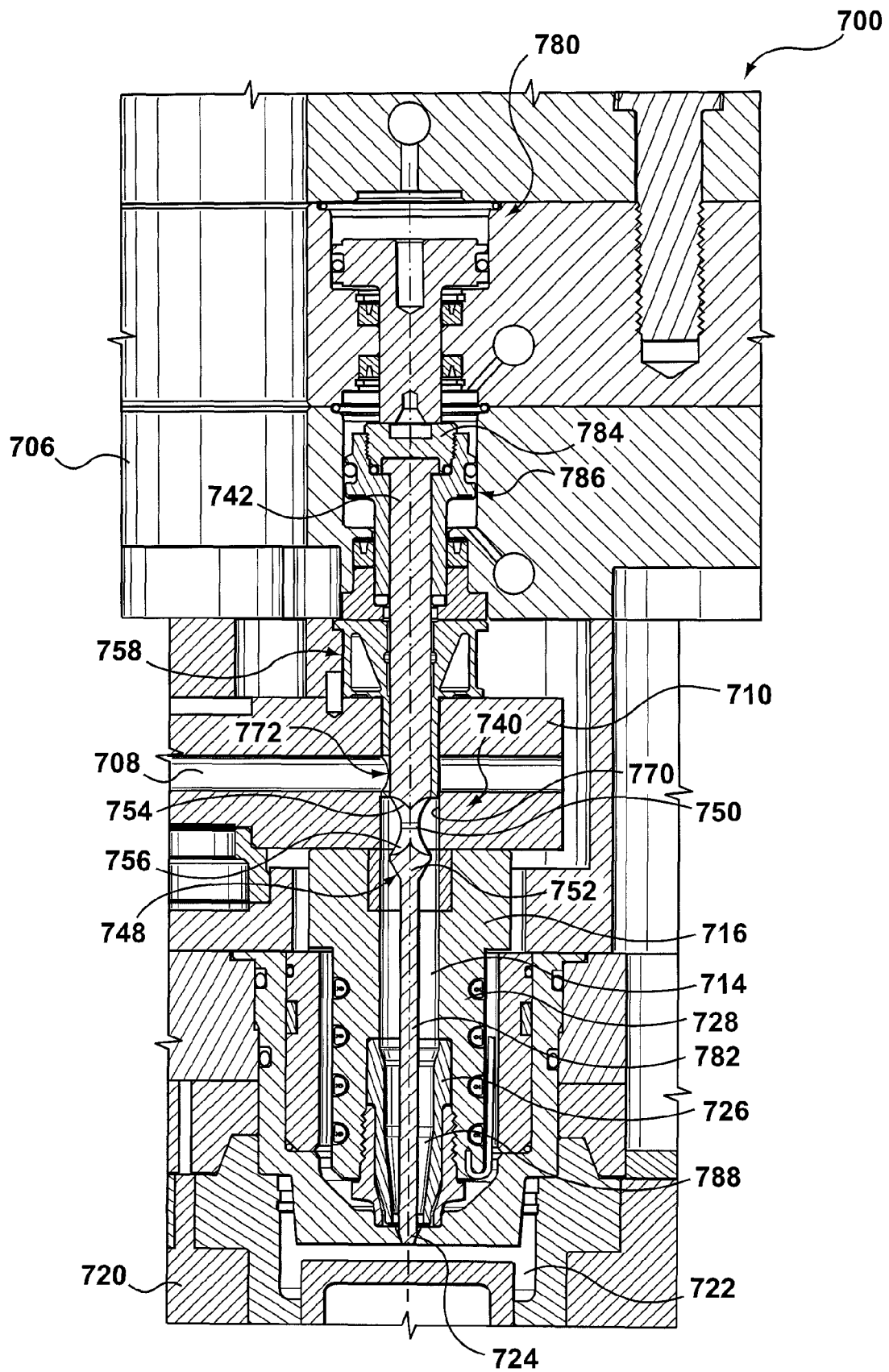
FIGS. 7 and 8 show a sectional view of a portion of an injection molding apparatus including a self-regulating valve according to another embodiment of the present invention.
Figure 8:
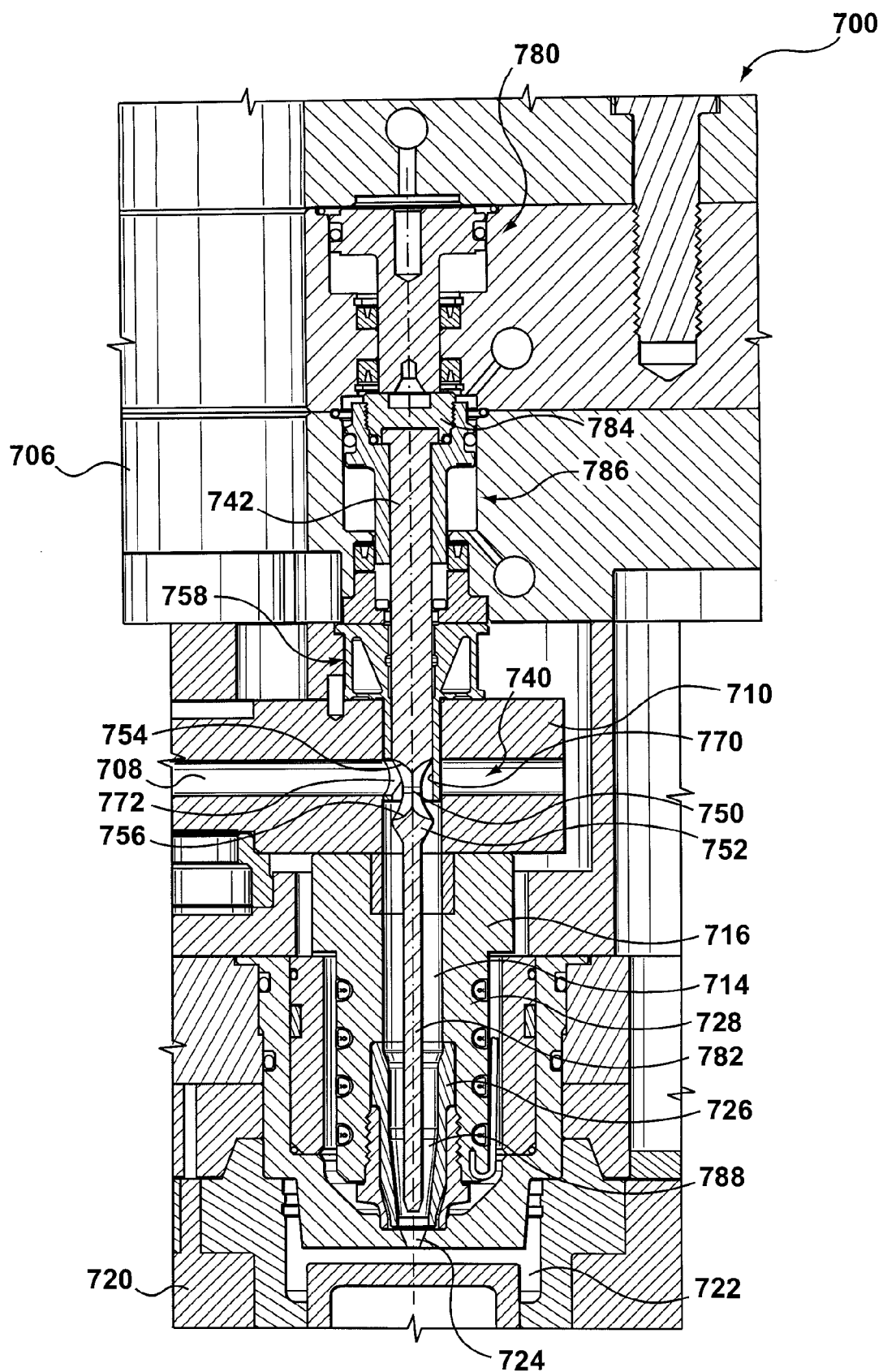

In another embodiment, shown in FIGS. 7 and 8, a self-regulating valve 740 is incorporated into a valve-gated nozzle 716. FIG. 7 shows self-regulating valve 740 and valve-gated nozzle 716 in a closed position, while FIG. 8 shows self-regulating valve 740 and valve-gated nozzle 716 in an open position.

Self-regulating valve 740 is located at least partially within a manifold 710 of an injection molding apparatus 700. Valve disk 758 is located between back plate 706 and manifold 710 and may serve as a thermal insulator. Flow aperture 772 is in fluid communication within a downstream portion of manifold melt channel 708. Self-regulating valve 740 is positioned at a location where manifold melt channel includes a 90° turn towards a nozzle 716. It shall be appreciated that the angle of the turn in the manifold melt channel is not critical and the self-regulating valve may be employed where the angle is less than or greater than 90°.

In this embodiment, a valve pin 782 is coupled to or extended from tip pressure surface 752 of control rod 742. Valve pin 782 extends through a melt channel 714 of a nozzle body 728 and through a melt channel 788 of a nozzle tip 726. In the closed state shown in FIG. 7, valve pin 782 extends within mold gate 724 when flow of the melt is desired to be stopped. Alternatively, in the open state shown in FIG. 8, valve pin 782 does not extend within mold gate 724, which allows for flow of the melt through gate 724 into mold cavity 720.

A control rod actuator 780 and a valve pin actuator 786 are used for actuation of the self-regulating valve 740 and valve pin 782, respectively. The control pressure required for regulation of melt pressure is supplied by control rod actuator 780 and valve pin actuator 786 is used to open and close mold gate 724 when required. Valve pin actuator 786 is coupled to control rod actuator 780 by coupling device 784 such that valve pin 782 is movable in unison with control rod 742 during an injection cycle while the melt flow rate is being regulated or varied by self-regulating valve 740.

Control rod 742 is carefully designed to minimize effects of shear and pressure drop along the circumference of control rod 742 and the only significant melt force acting on control rod 742 is due to melt pressure that acts on tip pressure surface 752 of control rod 742 opposite to the direction of flow. However by extending control rod 742 with valve pin 782 shear forces may result on control rod 742 and valve pin 782 that could tend to pull control rod 742 in the direction of flow. In order to maintain the self-regulating behavior of control rod 742 it is essential to minimize these shear forces so that they are insignificant compared to the melt force that acts on the projected area of the tip pressure surface 752 opposite to the direction of flow. In one embodiment, shear forces are minimized by maintaining a ratio of a diameter of control rod 742 to a diameter of valve pin 782 that is as large as possible. For instance, a diameter of control rod 742 may be about 5 mm, while a diameter of valve pin 782 may be about 2 mm, so that a ratio of about 5:2 is obtained. Actuation forces and mechanical strength of control rod 742 must be considered in determining this ratio. The necessary actuation forces will increase with increase in the diameter of valve pin 782 and strength of valve pin 782 will reduce with a reduction of the valve pin diameter.

With reference to FIG. 8, melt from manifold melt channel 708 enters flow aperture 772 and then flows into a valve disk bore 770, which extends longitudinally through valve disk 758, and further into a needle eye 750 of self-regulating valve 740. When self-regulating valve 740 is in an open position, as shown in FIG. 8, a portion of needle eye 750 is exposed to the melt channel downstream of valve disk bore 770 and in a downstream portion of manifold melt channel 708. As a result, the melt that flows through needle eye 750 is able to flow through the downstream portion of manifold melt channel 708 and into nozzle 716. When self-regulating valve 740 is in a closed position, as shown in FIG. 7, no portion of needle eye 750 is exposed to the downstream portion of manifold melt channel 708 and melt cannot flow through valve 740.

At the beginning of a molding cycle in injection molding apparatus 700, high pressure melt is injected from a machine nozzle (not shown) into manifold melt channel 708 upstream of self-regulating valve 740. The melt flows through manifold melt channel 708 and into a flow aperture 772 and needle eye 750 of self-regulating valve 740. As shown, the projected area of the upper needle eye pressure surface 754 is equal to the projected area of the lower needle eye pressure surface 756, therefore control rod actuator 780 is used to apply a downward force on control rod 742 to place self-regulating valve 740 in an open position. However, as described above, self-regulating valve 740 may also be configured so that a net force is created upon control rod 742 solely by the melt pressure or by a combination of the melt pressure and an external force device.

As melt flows through manifold melt channel 708, self-regulating valve 740, nozzle 716 and finally into a mold cavity 722; the melt pressure downstream of self-regulating valve 740 gradually increases to thereby act on tip pressure surface 752 of control rod 742 to create an upward force on control rod 742. The upward force eventually increases to a level where it overcomes the downward forces acting on control rod 742 and control rod 742 is slid upwardly. Upward motion of control rod 742 may place self-regulating valve 740 in the closed position or it may simply reduce the flow of melt through self-regulating valve 740. The reduction of melt flow may cause the downstream pressure to reduce to a level that the downward forces on control rod 742 exceed the upward force resulting in control rod 742 moving downward. The downward movement of control rod 742 then increases the flow and the cycle may be continued so that control rod 742 vacillates and maintains the melt pressure close to a target value.

Figure 9:
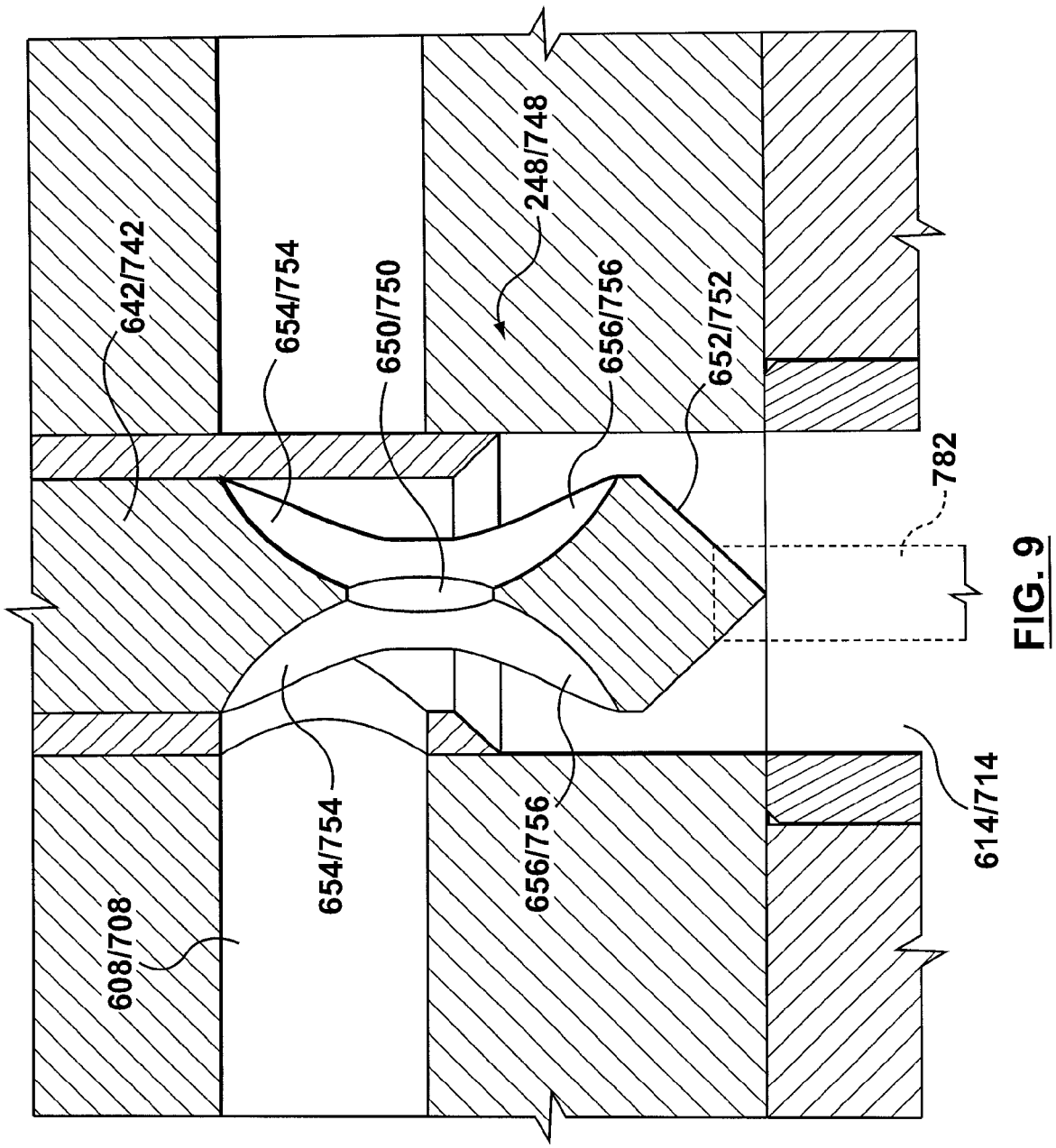
FIGS. 9 and 10 show zoomed views of a control rod tip portion of a self-regulating valve in open and closed positions, respectively, according to one embodiment of the present invention.
Figure 10:
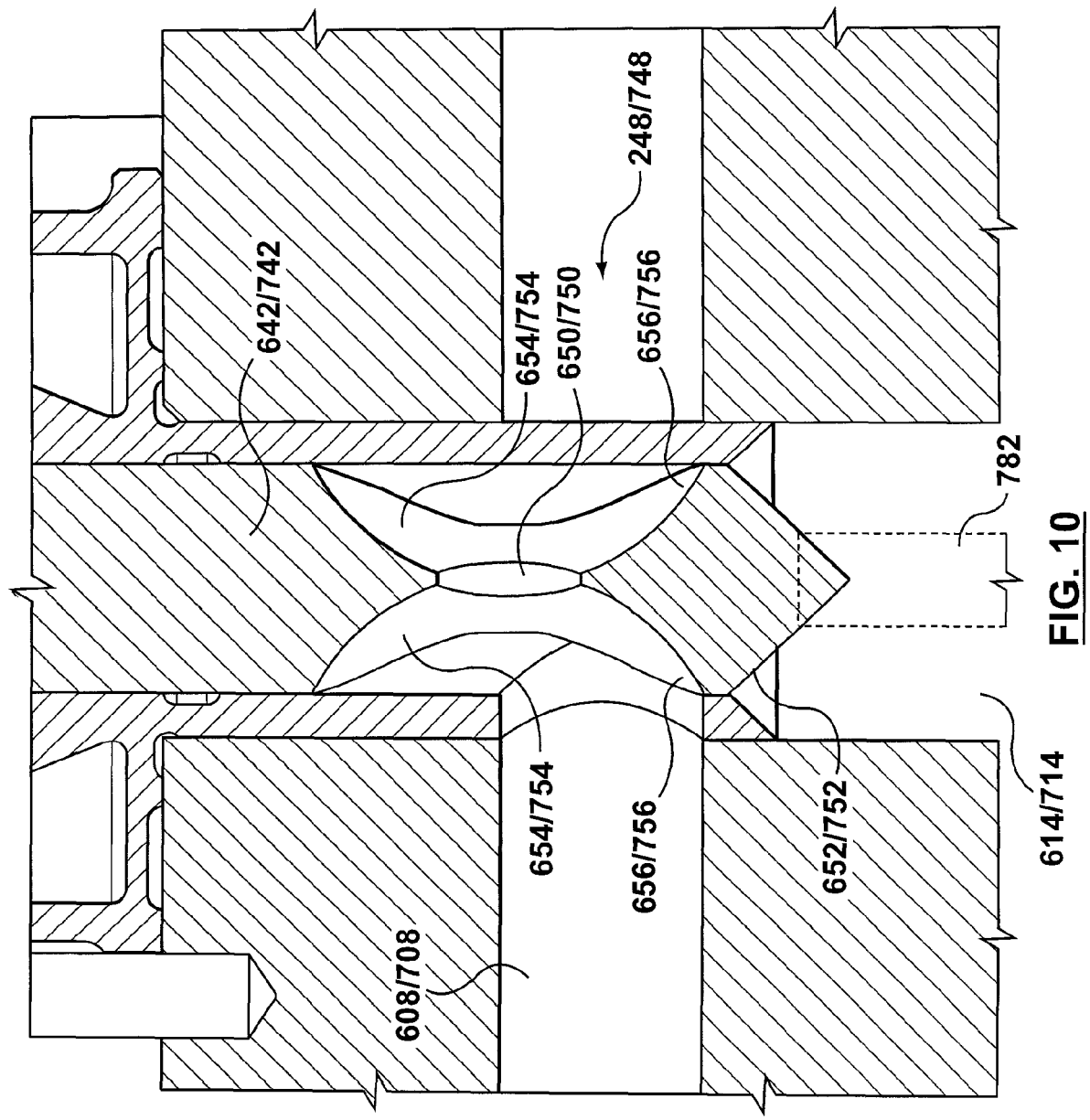

FIGS. 9 and 10 show zoomed views of control rod tip portion 248/748 of self-regulating valve 640/740 in open and closed positions, respectively, according to one embodiment of the present invention. Control rod tip portion 248/748 includes tip pressure surfaces 652/752, upper pressure surfaces 654/754, lower pressure surfaces 656/756, and openings 650/750. In valve-gated embodiment 700, rod tip portion 748 is coupled to valve pin 782.

As discussed above, when self-regulating valve 640/740 is in a closed position (as shown in FIG. 10) no melt flows from manifold melt channel 608/708 to nozzle melt channel 614/714 because control rod tip portion 248/748 is blocking the flow. In contrast, as also discussed above, when self-regulating valve 640/740 is in an open position (as shown in FIG. 9) the melt flows from manifold melt channel 608/708 to nozzle melt channel 614/714 over upper and lower pressure surfaces 654/754 and 656/756, respectively, and through opening 650/750. Regulation of the self-regulating valve 640/740 between open and closed positions is based on a difference in pressure value between the melt pressure against tip pressure surface 652/752 and the external control pressure exerted on a head portion of control rod 642/742.

Additionally, or alternatively, other shapes for the various surfaces and openings of self-regulating valve 240, 640, or 740 may be used, as would be apparent to a skilled artisan upon reading this description.

Figure 12:
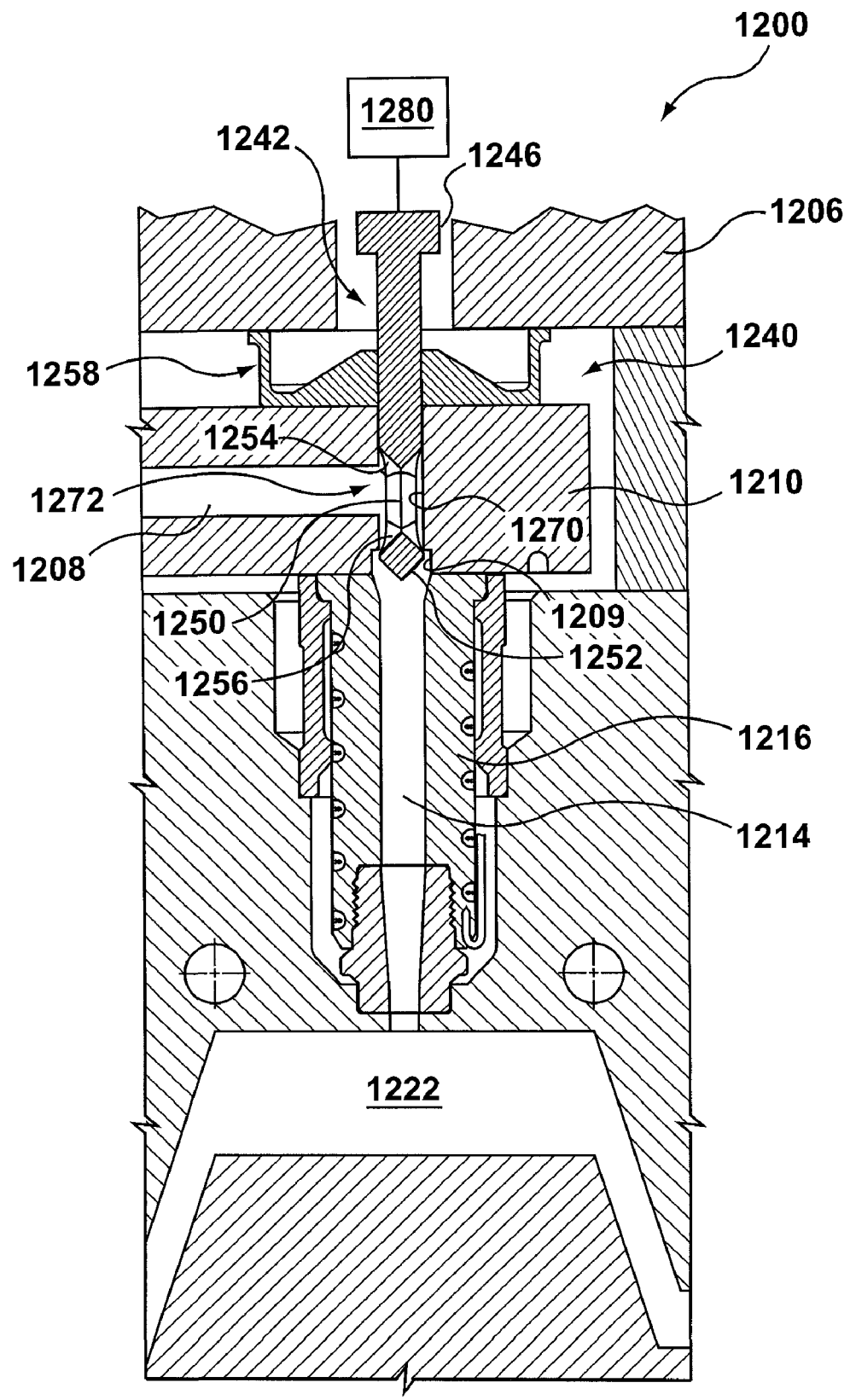
FIG. 12 is a sectional view of a portion of an injection molding apparatus including a self-regulating valve according to another embodiment of the present invention.

FIG. 12 shows an injection molding apparatus 1200 having a self-regulating valve 1240 located within manifold melt channel 1208 of manifold 1210. Self-regulating valve 1240 includes valve disk 1258 is located between manifold 1210 and a back plate 1206 and may serve as a thermal insulator. In this embodiment, valve disk 1258 does not include a support extension such that no portion of valve disk 1258 extends into manifold 1210. Although not an optimal design for some aggressive resins this design may be sufficient for other resin applications, this embodiment allows for the use of various valve disk known to one of ordinary skill in the art, such as those shown and described in U.S. Pat. No. 4,698,013 and U.S. Pat. No. 4,705,473, the disclosures of which are incorporated by reference herein in their entirety. Self-regulating valve 1240 includes control rod 1242 having needle eye 1250, upper and lower needle eye pressure surfaces 1254, 1256, and tip pressure surface 1254.

Self-regulating valve 1240 is positioned at a location where manifold melt channel 1208 includes a 90° turn towards hot runner nozzle 1216. Control rod 1242 is slidingly received within a manifold bore 1270 such that needle eye 1250 is alignable with an end 1272 of manifold melt channel 1208. Accordingly, a melt stream from manifold melt channel 1208 may flow through end 1272 and into manifold bore 1270 and through needle eye 1250.

When self-regulating valve 1240 is in an open position, as shown, a portion of needle eye 1250 is exposed to a counterbore 1209 within a downstream surface of manifold 1210 that fluidly communicates with nozzle melt channel 1214. As a result, the melt that flows into needle eye 1250 is able to flow through the downstream portion of manifold melt channel 1208 and into melt channel 1214 of nozzle 1216. When self-regulating valve 1240 is in a closed position, no portion of needle eye 1250 is exposed to counterbore 1209, i.e., the downstream portion of manifold melt channel 1208, and melt cannot flow through self-regulating valve 1240.

At the beginning of a molding cycle in injection molding apparatus 1200, high pressure melt is injected from a machine nozzle (not shown) into manifold melt channel 1208 upstream of self-regulating valve 1240. The melt flows through manifold melt channel 1208 and out end 1272 into needle eye 1250 of self-regulating valve 1240. As shown, the projected area of the upper needle eye pressure surface 1254 is equal to the projected area of the lower needle eye pressure surface 1256, therefore external force device 1280, e.g., a piston, a cylinder, a pressure valve, spring, actuator, is used to apply a downward force on control rod 1242 to place self-regulating valve 1240 in an open position.

As melt flows through manifold melt channel 1208, self-regulating valve 1240, and nozzle 1216 into mold cavity 1222, the melt pressure exerts a force on tip pressure surface 1252. This melt force tends to push control rod 1242 upwards while an external control force of external force drive 1280 is simultaneously applied to head portion 1246 of control rod 1242, which tends to push control rod 1242 downwards. As previously mentioned, the external control force may be based on a predetermined pressure profile. The longitudinal position of control rod 1242 is primarily governed by these two opposing forces.

During an injection cycle, if the external control force acting on head portion 1246 of control rod 1242 overcomes the melt force acting on tip pressure surface 1252, control rod 1242 moves downwards. The melt pressure on self regulating valve 1240 increases as control rod 1242 moves downwards such that the melt force on tip pressure surface 1252 increases. Control rod 1242 stops its downward movement when the melt force on tip pressure surface 1252 and the external control force acting on head portion 1246 of control rod 1242 reach equilibrium, e.g., are substantially equal.

Conversely, if the melt force acting on tip pressure surface 1252 overcomes the external control force acting on head portion 1246 of control rod 1242, control rod 1242 moves upwards such that the melt force exerted on tip pressure surface 1252 decreases. Control rod 1242 stops its upward movement when the melt force on tip pressure surface 1252 and the external control force acting on head portion 1246 of control rod 1242 reach equilibrium, e.g. are substantially equal.

Figure 11:
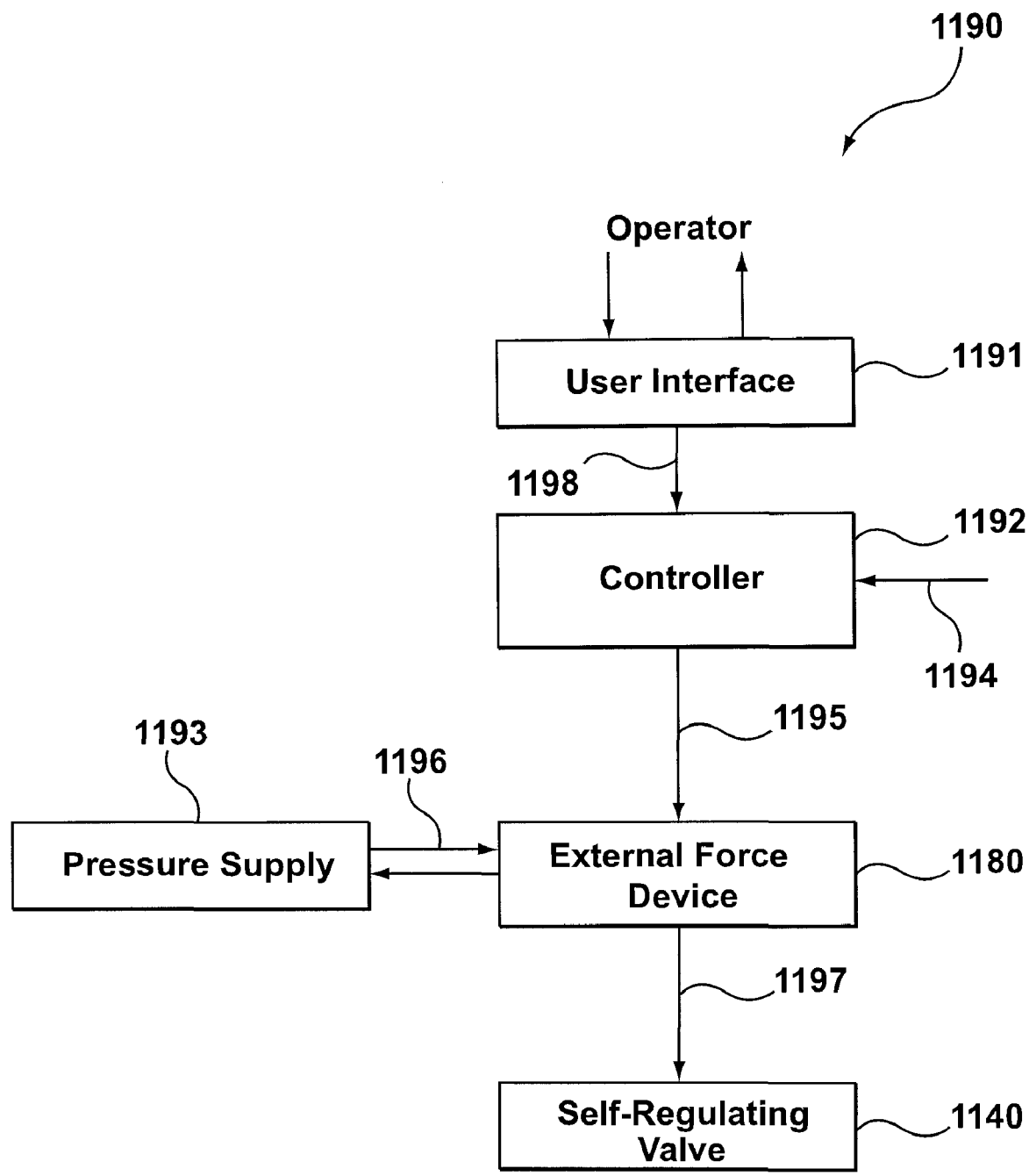
FIG. 11 is a block diagram of a control system, according to one embodiment of the present invention.

FIG. 11 shows a block diagram of an open-loop pressure control system 1190 according to one embodiment of the present invention. Open-loop pressure control system 1190 includes a user interface 1191, a controller 1192, a pressure supply 1193, an external force device, such as a solenoid valve, 1180, and a self-regulating valve 1140. In various embodiments, external force device 1180 may be similar to spring 680 or control rod actuator 780 described above. Additionally or alternatively, external force device 1180 can be a hydraulic/pneumatic proportional pressure valve. In addition, self-regulating valve 1140 can be similar to self-regulating valves 240, 640, 740 and 1240 described above. Although only one external force device 1180 and self-regulating valve 1140 are shown, it should be apparent to one of ordinary skill in the art that a plurality of external force devices 1180 and corresponding self-regulating valves 1140 can be used, such as one per injection molding nozzle in an injection molding system.

In various embodiments, user interface 1191 may be any input/output (I/O) device that allows for receiving and/or transmitting data to and from an operator and controller 1192. For example, user interface 1191 may be, but is not limited to, a keyboard, touch screen, voice activated I/O device, retinal following device, virtual keyboard, or the like. User interface 1191 is used by the operator to input pre-set pressure force profiles or individual pressure setting 1198 into controller 1192 for subsequent use by external force device 1180. In various embodiments, controller 1192 may be, but is not limited to, a processor, a microprocessor, a computer system, or the like, that is coupled to underlying software and external devices in order to receive, store, process, generate, and/or transmit data.

In operation at the start of a molding cycle, controller 1192 receives a start-up signal 1194 from a molding machine (not shown), indicating the molding cycle has started. Upon receipt of start-up signal 1194, controller 1192 sends an input 1195 of a pre-set pressure profile or pressure setting to external force device 1180. If the pressure profile varies the input signal 1195 is continuously fed to the external force device 1180 throughout the injection molding cycle, however if the pressure does not change a one time input signal 1195 can be sent at the start of the cycle to set the external force device 1180. The external force device 1180 does not receive any additional input from other sources during the injection cycle, as system 1190 is an open loop system and there is no feedback or sensed conditions being sent back to controller 1192.

In an embodiment, input 1195 can include information relating to an individual pressure profile at which the external force device 1180 receiving input 1195 is to be set for the current molding cycle. In another embodiment, the individual pressure profile is a range of different electronic voltage magnitudes that is downloaded, stored, and/or received at controller 1192 via an internal (Intranet) or external (Internet) wired or wireless network. Thus, when multiple nozzles are used having external force devices 1180 and self-regulating valves 1140 for each nozzle, a corresponding plurality of pressure value or profile inputs 1195 can be generated and individually set for each nozzle being regulated by a respective self-regulating valve 1140. Each pressure profile may be the same or different as may be necessitated by varying mold cavity sizes.

If external force device 1180 is a pneumatic or hydraulic actuator, solenoid valve or other fluid driven device, external force device 1180 uses input 1195 to control how much fluid material 1196 should be released from pressure supply 1193 to exert a desired force 1197 on self-regulating valve 1140 (or valves 1140), for example, an axial force exerted on control rod 242, 642, 742 or 1242 in the embodiments discussed above. In turn, a pressure on a melt stream is proportional to the output force of external force device 1180 on self-regulating valve 1140. When a decrease or increase in the force exerted by external force device 1180 is called for by the pre-set profile input from the controller 1192 fluid material 1196 will be released from or drawn into the external force device 1180 back to pressure supply 1193. In this manner, the pre-set pressure profile or pressure setting of external force device 1180 is maintained.

It shall be appreciated that an external force device may be used to selectively open, selectively close or provide an additional upward or downward force upon the control rod of the self-regulating valve. In addition, because the pressure surfaces are machined into the control rod, the net force acting on the control rod can be calculated for various upstream and downstream melt pressures. As a result, the self-regulating valve may be easily tuned to open or close at a specific pressure by altering the output of the external force device.

Additionally, or alternatively, once initial data is entered through user interface 1191, in one embodiment user interface 1191 can be removed from system 1190. Thus, user interface 1191 is not always required for continued operation.

While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. An injection molding apparatus, comprising:
   a manifold defining a manifold melt channel, the manifold being configured to receive melt from a melt source;
   a nozzle coupled to the manifold, wherein the nozzle defines a nozzle melt channel that is in fluid communication with the manifold melt channel;
   a self-regulating valve having a control rod partially positioned and slidable within the manifold melt channel at a location where the manifold melt channel has a 90° turn towards the nozzle, the control rod including an upstream end, an opening that extends through the control rod, and a tip pressure surface at a downstream end; and
   an external force device coupled to the upstream end of the control rod,
   wherein the self-regulating valve is configured to regulate melt flowing from the manifold melt channel through the control rod opening to the nozzle melt channel in response to an axial force exerted by the external force device on the upstream end of the control rod and a fluid pressure exerted by the melt on the tip pressure surface at the downstream end of the control rod.

2. The injection molding apparatus of claim 1, wherein the external force device is one of a hydraulic actuator, a pneumatic actuator, a weight and a spring.

3. The injection molding apparatus of claim 1, wherein the control rod slides in a direction to reduce melt flow through the control rod opening when the fluid pressure on the tip pressure surface of the control rod is greater than the axial force exerted by the external force device on the upstream end of the control rod.

4. The injection molding apparatus of claim 3, wherein the control rod slides in a direction to increase melt flow through the control rod opening when the fluid pressure on the tip pressure surface of the control rod is less than the axial force exerted by the external force device on the upstream end of the control rod.

5. The injection molding apparatus of claim 1, wherein the control rod opening includes an upper pressure surface at an upper surface of the opening and a lower pressure surface at a lower surface of the opening, wherein the upper pressure surface has a projected surface area equal to a projected surface area of the lower pressure surface.

6. The injection molding apparatus of claim 1, wherein the control rod opening includes an upper pressure surface at an upper surface of the opening and a lower pressure surface at a lower surface of the opening, wherein the upper pressure surface has a projected surface area that differs from a projected surface area of the lower pressure surface.

7. The injection molding apparatus of claim 1, wherein the control rod includes a valve pin that extends from a downstream end thereof such that the valve pin seats and unseats within a mold gate to open and close the mold gate.

8. The injection molding apparatus of claim 7, wherein a diameter of the control rod is larger than a diameter of the valve pin.

9. The injection molding apparatus of claim 8, wherein a diameter of the control rod and a diameter of the valve pin have a ratio of about 5:2.

10. The injection molding apparatus of claim 1, wherein the external force device applies a constant axial force on the control rod.

11. The injection molding apparatus of claim 1, wherein the external force device applies a variable axial force on the control rod.

12. A self-regulating valve for use in a melt channel of an injection molding apparatus comprising:

a control rod that includes an upstream end, an opening extending through the control rod sized to permit a melt stream of moldable material to flow therethrough, and a tip pressure surface at a downstream end; and an external force device coupled to the upstream end of the control rod, wherein the self-regulating valve is configured to regulate the melt flowing from the melt channel through the control rod opening in response to an axial force exerted by the external force device on the upstream end of the control rod and a fluid pressure exerted by the melt stream on the tip pressure surface on the downstream end of the control rod.

13. The self-regulating valve of claim 12, wherein the control rod slides in a direction to reduce the melt flowing from the melt channel through the control rod opening when the fluid pressure on the tip pressure surface of the control rod is greater than the axial force exerted by the external force device.

14. The self-regulating valve of claim 13, wherein the control rod slides in a direction to increase melt flowing from the melt channel through the control rod opening when the fluid pressure on the tip pressure surface of the control rod is less than the axial force exerted by the external force device.

15. The self-regulating valve of claim 12, wherein the control rod opening includes a rectangular cross section.

16. The self-regulating valve of claim 12, wherein the control rod opening is tapered such that the cross-section of the opening is larger toward an outer surface of the control rod.

17. The self-regulating valve of claim 12, wherein the external force device is one of a hydraulic actuator, a pneumatic actuator, a weight and a spring.

18. The self-regulating valve of claim 12, wherein the control rod opening includes an upper pressure surface at an upper end of the opening and a lower pressure surface at a lower end of the opening wherein the upper pressure surface has a projected surface area equal to a projected surface area of the lower pressure surface.

19. The self-regulating valve of claim 12, wherein the control rod opening includes an upper pressure surface at an upper end of the opening and a lower pressure surface at a lower end of the opening wherein the upper pressure surface has a projected surface area that differs from a projected surface area of the lower pressure surface.

20. The self-regulating valve of claim 12, wherein the external force device applies a constant axial force on the control rod.

21. The self-regulating valve of claim 12, wherein the external force device applies a variable axial force on the control rod.

* * * * *